Oct. 1, 1929.                C. CHILOWSKY ET AL                1,730,190
         METHOD AND MEANS FOR DISTINGUISHING BETWEEN
              NATURAL PEARLS AND CULTIVATED PEARLS
                   Filed Feb. 12, 1926        4 Sheets-Sheet 1

Inventors
Constantin Chilowsky
and Francis Perrin
By Mauro, Cameron, Lewis & Massie
attorneys

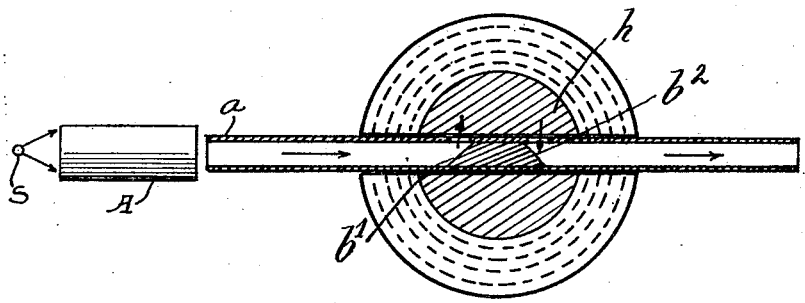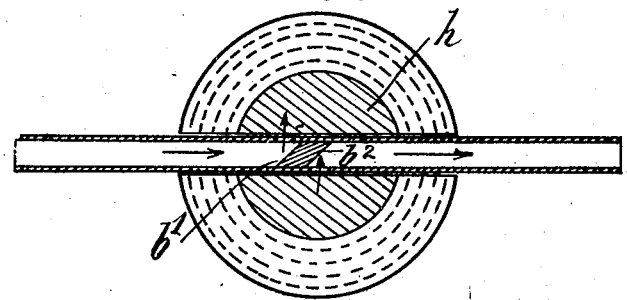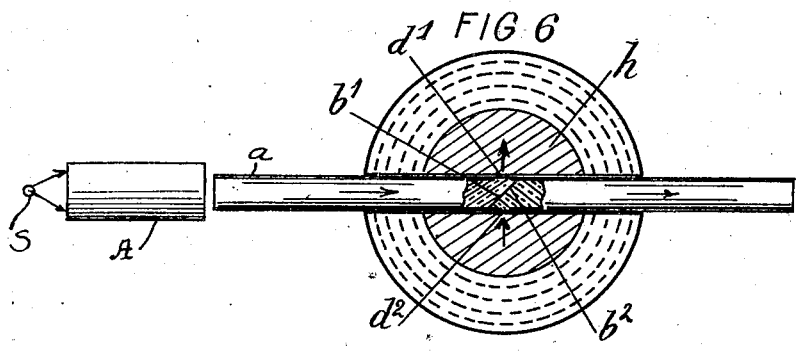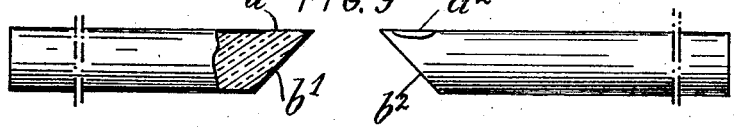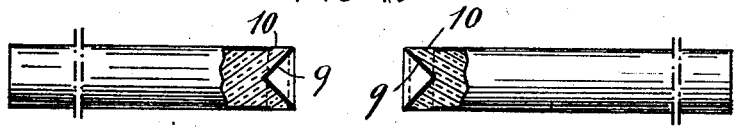

Oct. 1, 1929.  C. CHILOWSKY ET AL  1,730,190
METHOD AND MEANS FOR DISTINGUISHING BETWEEN
NATURAL PEARLS AND CULTIVATED PEARLS
Filed Feb. 12, 1926   4 Sheets-Sheet 3
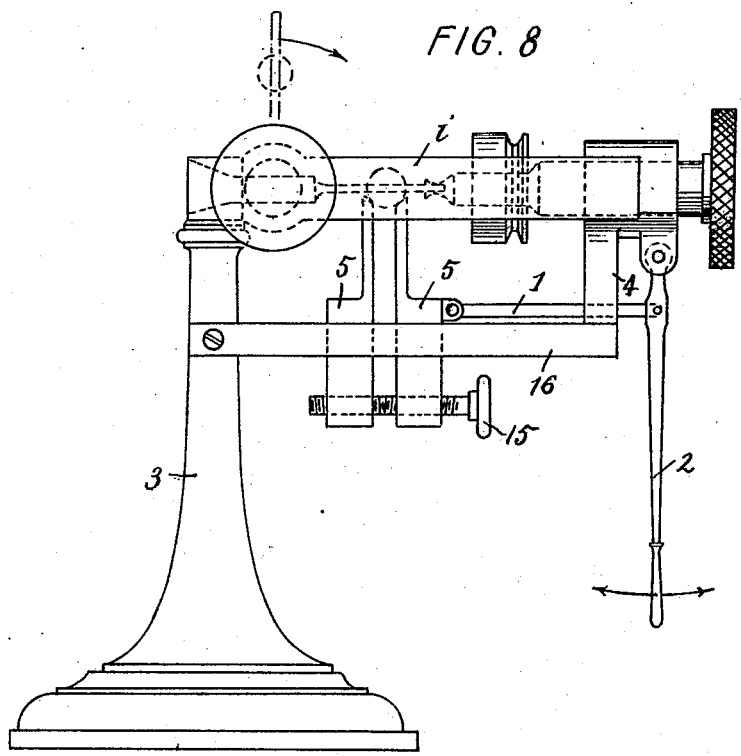
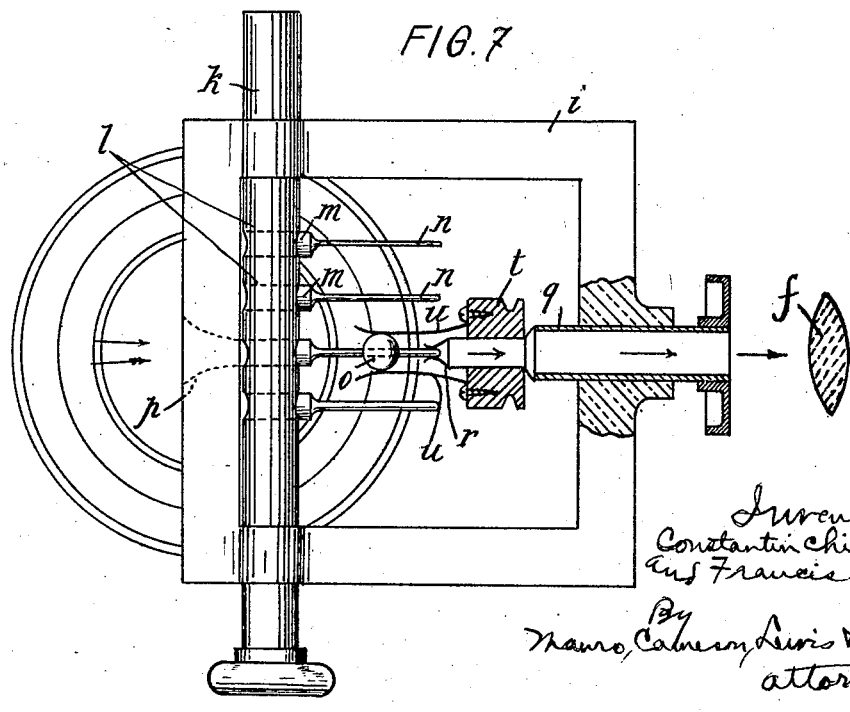

Oct. 1, 1929.   C. CHILOWSKY ET AL   1,730,190
METHOD AND MEANS FOR DISTINGUISHING BETWEEN
NATURAL PEARLS AND CULTIVATED PEARLS
Filed Feb. 12, 1926   4 Sheets-Sheet 4
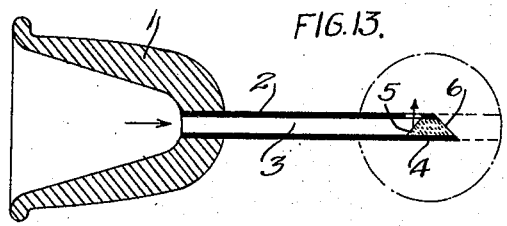
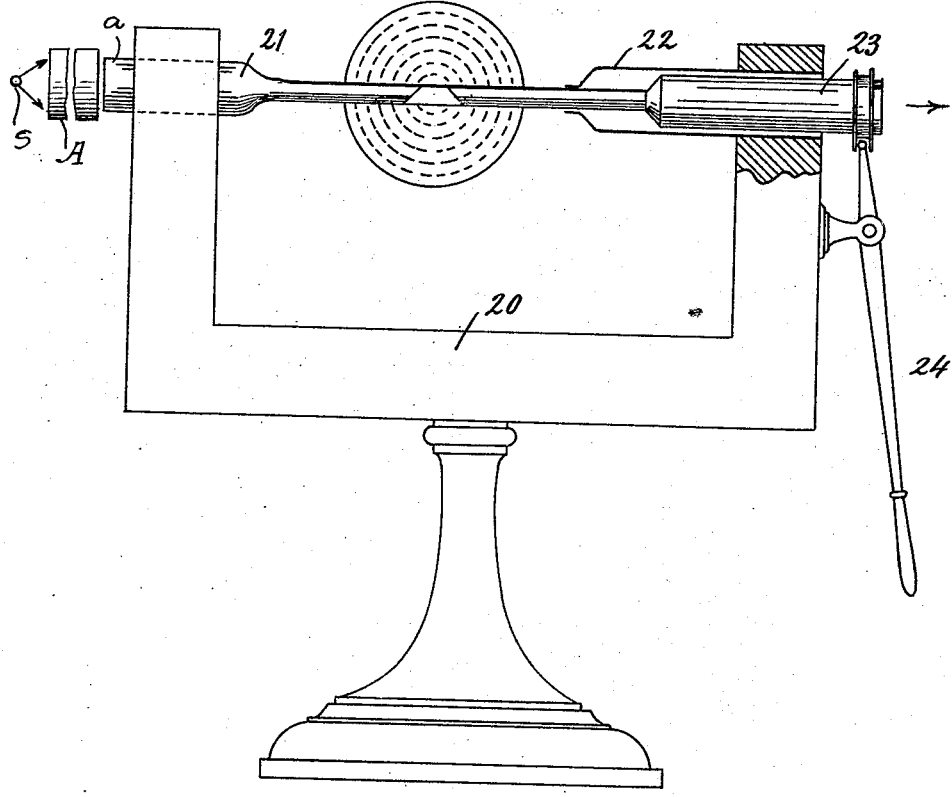

Patented Oct. 1, 1929

1,730,190

UNITED STATES PATENT OFFICE

CONSTANTIN CHILOWSKY AND FRANCIS PERRIN, OF PARIS, FRANCE

METHOD AND MEANS FOR DISTINGUISHING BETWEEN NATURAL PEARLS AND CULTIVATED PEARLS

Application filed February 12, 1926, Serial No. 87,914, and in France February 21, 1925.

A method of optical analysis has already been proposed whereby the natural pearls may be distinguished from Japanese pearls, which consists in lighting the pearl at the exterior, the pearl being pierced with a channel into which is inserted a needle bevelled at the end or a drop of mercury, serving as a mirror, and in observing on the axis of the channel the appearance of the image projected by the mirror, or in producing micro-photographs of this image. But this method offers disadvantages from the fact that the light is obliged to pass entirely through the pearl from the surface to the centre, and is thus absorbed to a great degree by the opaque layers of the spherical structure and by the flat layers of the mother-of-pearl core, and due to the effect of the artificial core, the light reaching the mirror will be much attenuated, thus rendering the luminous effect difficult to observe.

The present invention relates to a method by which the said disadvantages will be obviated, and which enables the observation of the optical properties of the core of the pearl by means of light which has not passed through the external spherical layers of the pearl, but has simply traversed the central part in the case of the natural pearls, and the mother-of-pearl core in the case of the Japanese pearls.

In our said method, we observe in the axial direction by means of a mirror placed in the channel of the pearl, the light which is sent axially into the other end of the channel of the pearl, this light being localized in such manner that before reaching the observing mirror it is obliged to traverse the natural or artificial core of the pearl.

In order to carry the said process into effect, we may employ a suitable arrangement which consists essentially of a tubular conduit for the light which is formed for instance by a hollow needle whereof the outer walls are opaque and the inner walls reflecting, and which may be readily inserted at variable distances into the channel formed in the pearl a panoramic mirror or a plane mirror inclined at a suitable angle such as 45° from the axis of the said conduit being disposed at the end of the latter and adapted to project the light which is sent axially into the interior of the pearl through apertures provided in the outer wall of the conduit. An observing mirror which is also disposed within the channel of the pearl and is inclined at an angle of 45 degrees from the axis of the conduit serves to project the light to the other end of the channel of the pearl. These two mirrors are separated by an opaque substance, so that the light thus deflected will be prevented from passing directly through the channel and will traverse the core of the pearl. The diffused light due to this illumination will reach the observing mirror by traversing the core partly in an oblique direction and partly in a direction parallel with the channel of the pearl, but passing around the opaque obstacle situated between the mirrors.

By displacing the two mirrors—which are maintained at a constant distance apart— along the channel of the pearl, the light is caused to traverse different layers of the pearl, and by observing in the second mirror the variations in the light which correspond to different displacement of the mirror, this will afford an indication of the transparency of the different layers, and particularly of the transparency of the core.

As a general rule, the artificial core of the Japanese pearls consists of mother-of-pearl which is formed of successive flat layers, whilst the core or inner part of the natural pearl is formed, like the peripheral part, of successive spherical layers, and the light will proceed much more readily along the said plane or spherical layers than in a direction perpendicular thereto, so that when the constantly spaced mirrors are moved forward in the channel of the natural pearl, the light reflected from the first mirror will attain the second mirror after traversing at least a certain portion of the internal mass of the pearl, and transversely of the said layers, this being true for all positions of the pair of mirrors in which they are off the centre of the pearl, since the spherical layers ending at one mirror are not the same as those ending at the second mirror.

In this manner the light will be considerably absorbed by the substance of the pearl, but there will be a position in which the two mirrors are symmetrical with respect to the centre of the pearl, so that the same layer or layers will connect the two mirrors, and the intensity of the light will be greater.

For this reason, with the natural pearls, when the pair of mirrors has substantially the central position, this will offer a well-defined maximum or light as compared with what is observed in all other positions. But with the artificial pearl whose core consists of flat layers, when the mirrors come near the central position this will afford uniform intensities of light—represented by a straight portion of the curve of intensities—since the light is obliged to traverse the flat layers in the perpendicular or the oblique direction. In the case in which the layers are parallel with the axis, the same straight portion of the curve will be observed, since the part traversed by the light will have a uniform nature as long as the mirrors are within the said core.

If however the spacing between the mirrors is not maintained constant, but they are moved forward in the channel in symmetrical disposition on each side of the centre, there will be observed a relative maximum of the light for each symmetrical position of the mirrors about the centre. Starting from this symmetrical position, if one of the mirrors is held in the fixed position and the other is moved slightly towards or from the centre, the relative maximum of intensity corresponding to the symmetrical position will now disappear, and the light will diminish in either case. In the natural pearls, this effect can be observed throughout the whole length of the channel, but in the artificial or cultivated pearls the effect of the relative maximum will disappear as soon as the mirrors come within the limits of the mother-of-pearl core which contains no spherical layers. It is obvious that this will afford a relatively close measurement of the diameter of the artificial core in the Japanese pearls. The rods with peripheral opening as shown in Fig. 10 are particularly adapted for this purpose. Furthermore, in the case of the Japanese pearls there are often observed discontinuous light effects when the mirror passes through the mother-of-pearl core.

A modification of the arrangement consists in placing the two 45-degree mirrors in the parallel position, and in order to pass from one mirror to the other, the light must pass through 180 degrees around the channel; in fact, the spacing between the two mirrors may be reduced to zero. By rotating the pearl on its axis, the natural pearls may be distinguished from Japanese pearls, firstly by observing the luminous intensity with reference to the angle of rotation, and secondly by observing the number of maxima of luminous intensity which occur during a complete rotation of the pearl on its axis.

In fact, in the case of natural pearls, the beam which is sent, during the rotation of the pearl, into a given set of layers will reach the second mirror without leaving this set, so that the light will remain constant during the rotation. But with the core of the Japanese pearl, each inclination of the flat layers relatively to the axis, of the channel will correspond to two minima and two maxima the second mirror without leaving this set, layers will connect the two mirrors twice in the revolution of the pearl, and this produces a maximum effect in each case.

The following description, with reference to the appended drawings, shows the manner in which the said invention is carried into effect.

Fig. 4 shows a corresponding arrangement in the case in which a Japanese pearl is traversed by the needle.

Fig. 5 relates to a modification comprising parallel mirrors.

Fig. 6 shows another modification in which the two mirrors are nearly in coincidence.

Fig. 7 is a diagrammatic plan view of a device for facilitating the execution of the method, and, Fig. 8 is an elevational view showing a modification of the said device.

Fig. 9 shows glass rods with flat mirrors, and,

Fig. 10 shows the same rods with panoramic mirrors.

Fig. 11 is a diagrammatic view showing an apparatus for mounting the said rods.

Figure 12:
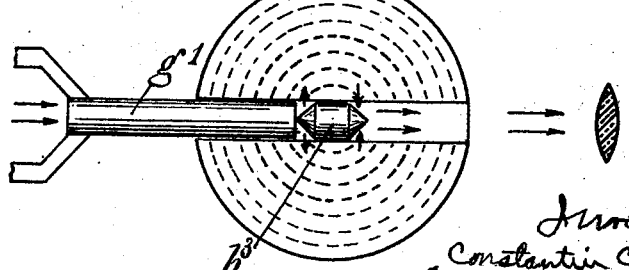

Fig. 12 relates to a modification of this apparatus.

Fig. 13 shows a modified form of construction of the needle.

Figure 1:
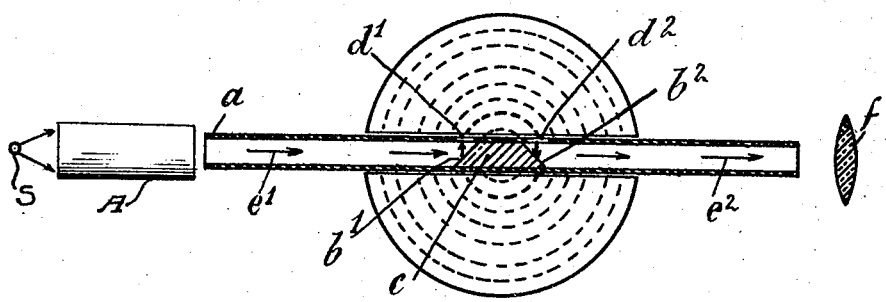
Fig. 1 is a diagrammatic sectional view showing the first embodiment of the invention.

As shown in Fig. 1, the hollow needle $a$ which is made for instance of nickel steel and has very thin walls, is inserted through the pearl; within the said needle are mounted two mirrors $b^1$ $b^2$ which are separated by an opaque substance $c$. Adjacent the said mirrors, the walls of the needle are apertured respectively at $d^1$ and $d^2$. A narrow and powerful beam of light is sent through the channel upon the mirror $b^1$ according to the arrows $e^1$. The beam may be produced as shown in Figs. 1, 2, 4, 6 and 11, by a source S, the light thereof being concentrated through a device A of any known type into the mouth piece of the channel $a$, it being understood that any known means for producing the narrow and powerful beam can be used. The beam is reflected at a 90 degree angle and passes through the aperture $d^1$ into the body of the pearl, in which it becomes diffused, chiefly following the spherical layers which are shown in the dotted lines, this being the most ready path. The direction of the light is shown in the heavy dotted lines in Fig. 1, and the light attains the second mirror $b^2$ whence it is reflected in the direction of the arrows $e^2$. It is then observed by means of a lens or microscope $f$.

The two mirrors $b^1$ $b^2$ and the opaque part $c$ may be formed by means of a small piece of steel or silver wire with bevelled ends.

Figure 2:
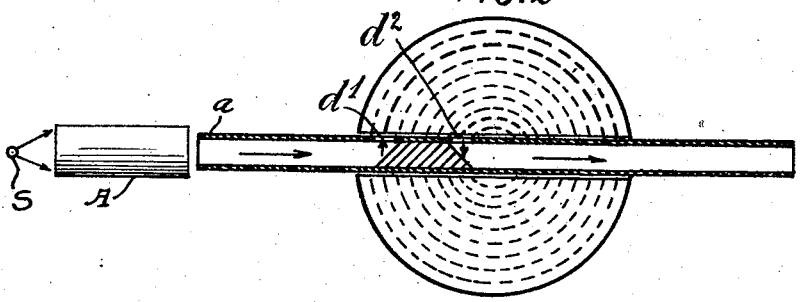
Fig. 2 is a corresponding view showing the mirrors off the centre of the pearl.

In Fig. 2, which shows the device placed off the centre of the pearl; the light issuing through the aperture $d^1$ produces its maximum effect at the other end of the dotted line, and then passes in the perpendicular direction through a certain number of layers before illuminating the layer which is also shown in dotted lines and corresponds to the aperture $d^2$, so that the light will be much weaker than in the case of Fig. 1.

Figure 3:
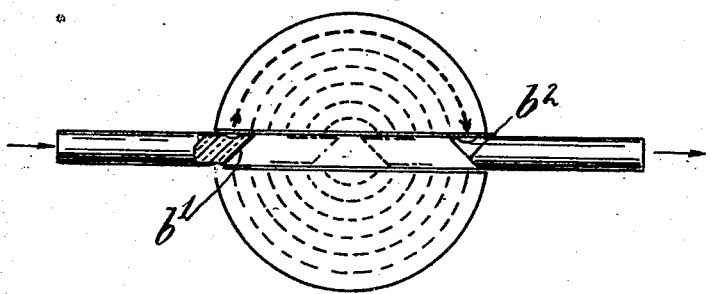
Fig. 3 shows the two mirrors moved forward symmetrically in the channel of the pearl.

Fig. 3 shows a like arrangement in the case in which the two mirrors $b^1$ $b^2$ can be displaced with reference to one another and also with reference to the centre. The mirrors are mounted on the ends of small rods, and the latter, shown in Fig. 9, consists of a transparent substance such as glass, acroleine or the like which is silvered on the surface, and preferably reinforced by electrolysis. The outer flat end of each rod is not silvered; the inner bevelled ends $b^1$ $b^2$ form mirrors which reflect the light through the respective unsilvered apertures $d^1$ or $d^2$.

In the case of the natural pearl, we bring the two rods near together so as to obtain the maximum illumination at the centre, as well as a relative maximum illumination for each position of the mirrors which are spaced equally on either side of the centre. But in the case of the Japanese or artificial pearl, this effect of the relative maximum will cease when the mirrors are inserted within the mother-of-pearl core. Furthermore, with a constant distance between the mirrors (Fig. 4) as long as the said mirrors remain within the mother-of-pearl core having flat layers, the light in order to proceed from the mirror $b^1$ to the mirror $b^2$, is obliged to traverse a certain number of such flat layers either perpendicularly or obliquely to their surface, the value of the light will be constant.

In the case of Fig. 5, $b^1$ and $b^2$ are two mirrors with parallel faces; the light reflected upwardly by $b^1$ is received by $b^2$, coming from the bottom. When the pearl is turned upon its axis, the position of the mother-of-pearl layers relatively to the path of the light will gradually vary and the light can proceed from $b^1$ to $b^2$ with greater facility according as the planes representing the layers come near the direction perpendicular to the mirrors. For the artificial pearls, it is thus observed that a rotation through 360 degrees on the axis will usually afford a maximum and a minimum luminous effect.

In Fig. 6, the mirrors $b^1$ and $b^2$ are juxtaposed, and the two apertures $d^1$ and $d^2$, which are very minute, are situated in the same plane perpendicular to the channel of the pearl. During the rotation of the pearl through 360 degrees, the inclined layers of the mother-of-pearl will coincide twice with a straight line perpendicular to the axis of the said channel and traversing the two apertures $d^1$ $d^2$. At these moments of coincidence, the same set of layers will come into contact with the said apertures upon their opposite sides, so that the light will issue through $d^1$ and will attain $d^2$ with great facility, so that two maxima and two minima can be observed during a 360 degrees rotation.

The double mirror $b^1$ $b^2$ is formed by means of two silvered glass rods which are bevelled at the ends and are placed together, with a small amount of an adhesive substance between the same.

The apparatus shown in Fig. 7 comprises a metallic frame $i$, which is traversed by the rotatable rod $k$; said rod is pierced diametrically with various holes $l$ adapted for the insertion of the sleeves or sockets $m$ of the hollow needles $n$ which have different diameters. In order to place a pearl $o$ upon a needle, the rod $k$ is turned so as to bring the needle into the vertical position (as shown in the dotted lines in Fig. 8) and the said needle is then brought into the horizontal position. A beam of light from an arc lamp or a lamp with a tungsten ball is sent through the tapered aperture $p$ in the frame $i$; the light passes through the hole $l$, the socket $m$ and the needle $n$, and leaves the pearl, as above stated, through the other end of the needle. The light then passes through the tube $q$ slidable in the frame $i$, and can be observed by the lens $f$. The tube $q$ ends in the tapered part $r$ which is in contact with the end of the needle $n$. Upon a portion of the tube $q$ having a smaller diameter and forming an axle, is mounted the pulley $t$ provided with a pair of clamping springs $uu$ adapted to hold the pearl. The pulley is turned in order to rotate the pearl upon its needle, in the case in which the pearl is to be examined by rotation.

The rod $k$ may be axially displaced in order to bring into coincidence with the aperture $p$ the needle whose diameter corresponds to the channel of the pearl under examination.

To displace the pearl along the needle, we provide a lever 2 (Fig. 8) controlling a rod 1 which is pivoted to a pair of discs 5, 5 which are adapted to seize the pearl; the spacing of the discs can be regulated by the screw with contrary threads 15. The said discs are slidable upon the guides 16 which are secured at one end to the main support 3 of the apparatus and at the other to an arm 4 secured to the frame $i$.

Fig. 10 shows two rods in which the bevel $b^1$ and $b^2$ is replaced by a conical recess 9 forming a panoramic mirror; herein the apertures $d^1$ or $d^2$ are replaced by the peripheral openings 10.

The device shown in Fig. 11 is chiefly adapted for use with the rods shown in Figs. 9 and 10, and it provides for the movement of the said rods within the pearl. For this purpose, we employ a U-shaped support 20 upon one end of which is mounted the rod 21 through which the light enters; on the other end of the support is mounted a socket 22 in which is movable the rod 23 which is traversed by the light after it passes through the pearl. A lever 24 which is pivoted to the support 20 serves to move the rod 23 within the said socket and hence within the pearl. The device for rotating the pearl or for sliding it upon the rods—not shown—in Fig. 11—may be the same as shown in Figs. 7 and 8.

The said rods are advantageous from the fact that their cross section is larger than that of the hollow needle $n$ whose walls necessarily have a certain thickness. In all cases, the rods or needles must fit accurately in the channel of the pearl so as to obviate all leakage of light along the channel, for this purpose we place a light plug or wad between the ends of the rods, and we may also introduce into the channel a drop of a liquid which is but slightly transparent.

A modification of the device is shown in Fig. 12. When operating with pearls having a very small channel, we place therein a small mirror $b^3$ tapered at each end and accurately fitting into the channel, it consisting for example of a small cylinder of 1 to 2 mm. length, terminating in a cone at each end. It is pushed along the channel by the rod $g^1$ of glass or of a transparent plastic substance such as acroleine and employed for lighting purposes, the said rod being flat at each end. A maximum luminous intensity is observed with natural pearls when the mirror $b^3$ passes through the centre. For the artificial or Japanese pearls, no such maximum is obtained. For a more exact observation of the light issuing from the pearl, we may employ photometric measurements, comparing the light with a source whose intensity can be regulated at will.

Experience shows that the observation of the light in the second mirror is facilitated when the tube is not extended beyond the second mirror, i. e. when this mirror is situated at the end of the said tube. The same modification applies to the needle which comprises a panoramic mirror. But the tube thus shortened will afford passage between the channel of the pearl and the mirror for a small amount of light which hinders the observation. To obviate this defect we dispose an iris diaphragm upon the microscope of small power by which the second mirror is observed, so that the beam can be cut down in such manner as to eliminate this prejudicial light.

Fig. 13 shows a needle which is thus modified.

In this figure, 1 indicates the socket or holder of the needle 2, whereof the channel 3 contains a member 4 forming the two mirrors, and this generally consists of a piece of silver or platinum wire which is bevelled at each end in order to form the two mirrors 5 and 6.

What we claim is:

1. A process for distinguishing between natural pearls and the cultivated pearls known as "Japanese," the said pearls being pierced or drilled, which consists in sending a beam of light into the channel or bore of the pearl in providing means disposed in the channel of the pearl whereby said beam of light will enter the main body or substance of the pearl for lighting the interior of the pearl in directing the diffused light out of the other end of the channel, and in observing the light diffused by the interior of the pearl and issuing from the other end of the said channel after it has traversed the main body of the pearl.

2. A process for distinguishing between natural pearls and the cultivated pearls known as "Japanese," the said pearls being pierced with a channel, which consists in sending a beam of light into one end of the said channel, in placing at least one mirror in said channel whereby the light is deflected into the main body or substance of the pearl in directing the diffused light out of the other end of the channel, in giving a relative displacement to the pearl and the mirror, and in observing at the other end of said channel the variations in the intensity of the diffused light which has traversed the main body or substance of the pearl and issuing at this end of the channel.

3. A process for distinguishing between natural pearls and the cultivated pearls known as "Japanese," the said pearls being pierced with a channel which consists in sending light into one end of the said channel, in disposing an optical mirror within the said channel, in such manner that the light will be deflected into the main body or substance of the pearl in directing the diffused light out of the other end of the channel, in giving the said mirror a lengthwise displacement within the said channel, and in observing the variations in the intensity of the diffused light which has traversed the main body or substance of the pearl and issuing at the other end of the said channel.

4. A process for distinguishing between natural pearls and the cultivated pearls known as "Japanese" the said pearls being pierced with a channel, which consists in sending light into one end of the said channel, in disposing an optical mirror within the said channel, in such manner that the light will be deflected into the main body or substance of the pearl in directing the diffused light out of the other end of the channel, in rotating the pearl about the axis of the said channel, and in observing the variations in the intensity of the diffused light which has traversed the main body or substance of the pearl, and issuing at the other end of the said channel.

5. A device for distinguishing between natural pearls and the cultivated pearls known as "Japanese" the said pearls being pierced with a channel, comprising a hollow needle whose external diameter is equal to the internal diameter of the said channel, a wire member which is bevelled at each end so as to form two mirrors and is disposed at the end of the needle, an aperture being formed opposite the rearwardly situated mirror whereby the light may traverse the main body or substance of the pearl.

6. A device for distinguishing between natural pearls and the cultivated pearls known as "Japanese" the said pearls being pierced with a channel, comprising a hollow needle whose external diameter is equal to the internal diameter of the said channel, a wire member which is beveled at each end so as to form two mirrors and is disposed at the end of the needle, an aperture being formed opposite the rearwardly situated mirror whereby the light may traverse the main body or substance of the pearl, optical means for observing the light issuing from the channel of the pearl, and a diaphragm comprised in the said optical means for the optional elimination of the parasitic light passing between the channel in the pearl and the said needle.

7. An apparatus for distinguishing between natural pearls and the cultivated pearls known as "Japanese" the said pearls being pierced with a channel, comprising an illuminant producing a concentrated beam of light, means for sending the light into the said channel, means for supporting the pearl, means for displacing the pearl upon the said means for sending the light into the pearl, means for reflecting the light sent into the said channel into the main body or substance of the pearl, and optical means for observing the variations of the light issuing from the other end of said channel after the light has passed through the main body or substance of the pearl.

In testimony whereof we have signed this specification.

CONSTANTIN CHILOWSKY.
FRANCIS PERRIN.